United States Patent
Ren et al.

(10) Patent No.: US 12,472,512 B2
(45) Date of Patent: Nov. 18, 2025

(54) SODIUM PETROLEUM SULFONATE COLLECTOR FOR FLUORITE FLOTATION AND ITS PREPARATION AND APPLICATION METHOD

(71) Applicant: WUHAN UNIVERSITY OF TECHNOLOGY, Wuhan (CN)

(72) Inventors: Zijie Ren, Wuhan (CN); Zhengzheng Guo, Wuhan (CN); Huimin Gao, Wuhan (CN); Yuhao He, Wuhan (CN); Yang Liu, Wuhan (CN); Xin Fang, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 612 days.

(21) Appl. No.: 17/938,983

(22) Filed: Sep. 7, 2022

(65) Prior Publication Data
US 2023/0143136 A1  May 11, 2023

(30) Foreign Application Priority Data

Nov. 1, 2021  (CN) .......................... 202111281292.7
Sep. 2, 2022  (CN) .......................... 202211072617.5

(51) Int. Cl.
*B03D 1/012* (2006.01)
*B03D 1/02* (2006.01)
*C02F 1/24* (2023.01)
*C07C 309/01* (2006.01)
*C02F 103/10* (2006.01)

(52) U.S. Cl.
CPC .............. *B03D 1/012* (2013.01); *B03D 1/02* (2013.01); *C02F 1/24* (2013.01); *C07C 309/01* (2013.01); *B03D 2201/02* (2013.01); *B03D 2203/02* (2013.01); *C02F 2103/10* (2013.01)

(58) Field of Classification Search
None
See application file for complete search history.

(56) References Cited

U.S. PATENT DOCUMENTS 6,225,267 B1 * 5/2001 Eckard .................. C07C 309/31
508/390
2004/0248996 A1 * 12/2004 Costello ............... C10M 173/00
516/58

FOREIGN PATENT DOCUMENTS

WO  WO-2018000433 A1 *  1/2018

OTHER PUBLICATIONS

Machine translation of WO-2018000433-A1, pp. 1-10. (Year: 2018).*

* cited by examiner

*Primary Examiner* — Clare M Perrin

(57) ABSTRACT

Disclosed is a sodium petroleum sulfonate collector for fluorite flotation, comprising sodium petroleum sulfonate and non-polar oil, wherein the molar ratio of the non-polar oil to the sodium petroleum sulfonate is 3.33-5.67, the sodium petroleum sulfonate comprises raw material oil and active substance, the molecular weight of the raw material oil is 350-450, the molecular weight of the sodium petroleum sulfonate is 500-750, the aromatic hydrocarbon comprises benzene ring hydrocarbon and naphthalene ring hydrocarbon, the content of the benzene ring hydrocarbon is 5% to 11%, and the content of the naphthalene ring hydrocarbon is 5% to 5.2%, the raw material oil needs to be sulfonated by sulfur trioxide, and the molar ratio of the aromatic hydrocarbon to the sulfur trioxide in the raw material oil is 2.4 to 5. The sodium petroleum sulfonate collector proposed by this disclosure is both efficient and low temperature resistant.

2 Claims, No Drawings

SODIUM PETROLEUM SULFONATE COLLECTOR FOR FLUORITE FLOTATION AND ITS PREPARATION AND APPLICATION METHOD

FIELD OF THE DISCLOSURE

The disclosure relates to the technical field of mineral flotation, in particular to sodium petroleum sulfonate collector for fluorite flotation and its preparation and application method.

BACKGROUND

The main chemical composition of fluorite is calcium fluoride, which often coexists with quartz, calcite, barite, and metal sulfide minerals. Because of its unique chemical properties, fluorine atoms are widely used in new or traditional industries such as metallurgy, new energy, chemical industry, atomic energy industry, building materials industry, and pesticides industry, At the policy level, China has positioned fluorite as an "exhausted and non-renewable precious resource", and fluorite is regarded as the "second rare earth" in the related industry. As an important non-metallic mineral raw material, fluorite plays an increasingly important role in the China's economy.

In the separation process of fluorite, flotation is currently the main beneficiation method for separating fluorite and gangue minerals. Fluorite ore collectors can be classified into fatty acids, modified fatty acids, combined collectors, and new collectors, etc. Among these collectors, the commonly used collectors include anionic oxyacids, cationic amines, ion-variable amphoteric collectors, etc., but these collectors have deficiencies in low temperature resistance.

Feng Ansheng et al. found that the recovery rate of beneficiation in North China is generally lower than that in South China, and the annual economic loss of more than 100 million yuan is caused by the low recovery rate. In addition to the difference in beneficiation process and ore properties, the main reason is that the low temperature resistance of oleic acid series collectors commonly used in beneficiation plants leads to low recovery rate (the recovery rate in winter is about 8% lower than that in summer). At the same time, heating and flotation of pulp are not only inconvenient in production management, but also increase energy consumption. Therefore, how to improve the flotation effect of collectors at room temperature or even lower temperature has become an important issue in fluorite flotation.

SUMMARY

The purpose of this disclosure is to provide a sodium petroleum sulfonate collector for fluorite flotation and its preparation and application method to solve the problem that the existing fluorite ore collectors suffer from inefficiency and low temperature resistance.

To solve the above questions, this disclosure provides a sodium petroleum sulfonate collector for fluorite flotation, comprising sodium petroleum sulfonate and non-polar oil, wherein the molar ratio of the non-polar oil to the sodium petroleum sulfonate is 3.33-5.67, the sodium petroleum sulfonate comprises raw material oil and active substance (generally hydrocarbyl sulfonate), the molecular weight of the raw material oil is 350-450, the content of the active substance is 35%-60%, the molecular weight of the sodium petroleum sulfonate is 500-750, the raw material oil comprises aromatic hydrocarbon, and the content of the aromatic hydrocarbon is between 10% and 31%, the aromatic hydrocarbon comprises benzene ring hydrocarbon and naphthalene ring hydrocarbon, the content of the benzene ring hydrocarbon is between 5% and 11%, and the content of the naphthalene ring hydrocarbon is between 5% and 5.2%, the raw material oil needs to be sulfonated by sulfur trioxide, and the molar ratio of the aromatic hydrocarbon to the sulfur trioxide in the raw material oil is between 2.4 and 5.

This disclosure also provides a preparation method for the sodium petroleum sulfonate collector for fluorite flotation, comprising the following steps:

S1, preparing sodium petroleum sulfonate solution by dissolving sodium petroleum sulfonate in water;

S2, putting the sodium petroleum sulfonate solution into a volumetric flask, then putting the non-polar oil into the volumetric flask, then making up the volume and pouring it into a beaker;

S3, obtaining the sodium petroleum sulfonate collector by shaking in an ultrasonic oscillator for more than 9 minutes.

This disclosure also provides an application method of the sodium petroleum sulfonate collector for fluorite flotation, comprising the following steps:

S1, adding water to fluorite to prepare a pulp and keeping the temperature of the pulp constant;

S2, preparing sodium petroleum sulfonate solution by dissolving sodium petroleum sulfonate in water, then putting the sodium petroleum sulfonate solution into a volumetric flask, then putting the non-polar oil into the volumetric flask, and then making up the volume and pouring it into a beaker, then carrying out ultrasonic emulsification to obtain the sodium petroleum sulfonate collector;

S3, adding the pulp into a flotation machine and adjusting the pulp, then adding sodium hydroxide to adjust the pH value, then adding the sodium petroleum sulfonate collector, then stirring, inflating, and then scraping the foam to get a foam product, which is fluorite concentrate.

Compared with the prior art, the beneficial effects of this disclosure are:

(1) The prepared sodium petroleum sulfonate collector can have a good collection effect under environment of normal temperature or even lower temperature; at the same time, the active substance in the sodium petroleum sulfonate collector has a good synergistic flotation effect with non-polar oil, and has a strong chemical interaction with fluorite, and is less affected by the change of pulp.

(2) The molecular weight of raw material oil is 350-450, and the molecular weight of the sodium petroleum sulfonate is 500-750, so that the number of sulfonate groups in sodium petroleum sulfonate is the best and the degree of sulfonation is the highest; the content of the active substance is 35% to 60%, so that the collector has the best flotation effect on fluorite mineral particles; the content of the aromatic hydrocarbon is 10% to 31%, the content of benzene ring hydrocarbons is 5% to 11%, and the content of the naphthalene ring hydrocarbon is 5% to 5.2%, so that the collector has a good collection effect in the flotation process; the molar ratio of the aromatic hydrocarbon to sulfur trioxide is 2.4 to 5, which makes the hydrophobic ability of the collector good; the molar ratio of the non-polar oil to the sodium petroleum sulfonate is 3.33-5.67, which not only makes the collector have a good flotation effect, but also makes the collector have a good hydrophobicity.

(3) The non-polar oil is kerosene, dodecane, or monomethyl naphthalene, which not only has good synergistic effect, but also makes the collector have good hydrophobic performance; the sodium petroleum sulfonate is sodium alkyl benzene sulfonate, which makes sodium petroleum sulfonate synergistic with the non-polar oil.

DETAILED DESCRIPTION OF PREFERRED EMBODIMENTS

This disclosure will be further described in detail below in conjunction with specific embodiments.

A sodium petroleum sulfonate collector for fluorite flotation, comprising sodium petroleum sulfonate and non-polar oil, wherein the molar ratio of the non-polar oil to the sodium petroleum sulfonate is 3.33-5.67, the sodium petroleum sulfonate comprises raw material oil and active substance (generally hydrocarbyl sulfonate), the molecular weight of the raw material oil is 350-450, the content of the active substance is 35%-60%, the molecular weight of the sodium petroleum sulfonate is 500-750, the raw material oil comprises aromatic hydrocarbon, and the content of the aromatic hydrocarbon is between 10% and 31%, the aromatic hydrocarbon comprises benzene ring hydrocarbon and naphthalene ring hydrocarbon, the content of the benzene ring hydrocarbon is between 5% and 11%, and the content of the naphthalene ring hydrocarbon is between 5% and 5.2%, the raw material oil needs to be sulfonated by sulfur trioxide, and the molar ratio of the aromatic hydrocarbon to the sulfur trioxide in the raw material oil is between 2.4 and 5.

The non-polar oil is kerosene, dodecane, or monomethylnaphthalene.

The sodium petroleum sulfonate is sodium alkylbenzenesulfonate, which is a sodium salt of straight-chain alkylbenzenesulfonic acid composed of 14-18 carbon atoms, and the structural formula is $CH_3(CH_2)_nSO_3Na$ (n=13-17).

A preparation method for the sodium petroleum sulfonate collector for fluorite flotation, comprising the following steps:

S1, preparing sodium petroleum sulfonate solution by dissolving sodium petroleum sulfonate in water;

S2, putting the sodium petroleum sulfonate solution into a volumetric flask, then putting the non-polar oil into the volumetric flask, then making up the volume and pouring it into a beaker;

S3, obtaining the sodium petroleum sulfonate collector by shaking in an ultrasonic oscillator for more than 9 minutes.

In step S1, the preparation method of the sodium petroleum sulfonate is firstly sulfonating C14~C18 straight-chain alkanes in petroleum product to obtain oil-soluble sulfonic acid, then neutralizing the oil-soluble sulfonic acid with sodium hydroxide to make it into crude sodium petroleum sulfonate, then, extracting the crude sodium petroleum sulfonate from neutral oil with low-carbon alcohol water, and then obtaining the refined sodium petroleum sulfonate through a series of treatments of dehydration, decolorization, deoiling, water washing, and concentration.

In step S2, the non-polar oil is kerosene, dodecane, or monomethylnaphthalene.

An application method of the sodium petroleum sulfonate collector for fluorite flotation according to claim 1, comprising the following steps:

S1, adding water to fluorite to prepare a pulp and keeping the temperature of the pulp constant;

S2, preparing sodium petroleum sulfonate solution by dissolving sodium petroleum sulfonate in water, then putting the sodium petroleum sulfonate solution into a volumetric flask, then putting the non-polar oil into the volumetric flask, and then making up the volume and pouring it into a beaker, then carrying out ultrasonic emulsification to obtain the sodium petroleum sulfonate collector;

S3, adding the pulp into a flotation machine and adjusting the pulp, then adding sodium hydroxide to adjust the pH value, then adding the sodium petroleum sulfonate collector, then stirring, inflating, and then scraping the foam to get a foam product, which is fluorite concentrate.

In step S2, the non-polar oil is kerosene, dodecane, or monomethylnaphthalene.

In step S2, obtaining the sodium petroleum sulfonate collector by shaking in an ultrasonic oscillator for more than 9 minutes.

In step S2, the preparation method of the sodium petroleum sulfonate is firstly sulfonating C14~C18 straight-chain alkanes in petroleum product to obtain oil-soluble sulfonic acid, then neutralizing the oil-soluble sulfonic acid with sodium hydroxide to make it into crude sodium petroleum sulfonate, then, extracting the crude sodium petroleum sulfonate from neutral oil with low-carbon alcohol water, and then obtaining the refined sodium petroleum sulfonate through a series of treatments of dehydration, decolorization, deoiling, water washing, and concentration.

The principle of this disclosure is described as follows:

Sodium petroleum sulfonate has a long history of being used as a collector in the field of mineral flotation. It has been used in the froth flotation of andalusite minerals, mica-quartz silicate minerals, and iron-manganese minerals for a long time, and it exhibits good performance of low temperature resistance. The excellent performance of sodium petroleum sulfonate as a flotation collector is closely related to its composition and structure. However, the flotation behavior of different types of sodium petroleum sulfonate varies greatly due to the complexity of the composition and structure of synthetic raw material oil and the difference in sulfonation process. Therefore, according to the content of hydrocarbon groups in raw material oil and different degrees of sulfonation, as well as the synergistic effect between different types of hydrocarbon sulfonates and non-polar oil, a sodium petroleum sulfonate collector to fluorite with high efficiency and low temperature resistance is proposed.

The change of the molecular weight of the sodium petroleum sulfonate reflects the content change of the sulfonic acid group in the collector. The more sulfonic acid groups, the larger the molecular weight of the sodium petroleum sulfonate, and the higher the sulfonation degree of the flotation collector; the fewer the sulfonic acid groups, the smaller the molecular weight of the sodium petroleum sulfonate, and the lower the sulfonation degree of the flotation collector. For sodium petroleum sulfonate, when it is used as a collector in the flotation process, the main reacting group is the sulfonate group. Therefore, the number of sulfonate groups in the structure of sodium petroleum sulfonate, i.e., the degree of sulfonation, is closely related to the flotation performance of the collector. By comparing the number of sulfonate groups of sodium petroleum sulfonate with different molecular weights, it is determined that when the molecular weight is between 500 and 750, the number of sulfonate groups in the sodium petroleum sulfonate is the best and the degree of sulfonation is the highest.

The content of the active substance in sodium petroleum sulfonate reflects the content of effective anionic surfactant in the collector. From the test results, when the active substance content in the collector exceeds 35%, the higher the content, the greater the flotation recovery rate of fluorite. However, after the content exceeds 60%, the flotation recovery rate no longer increases, or even decreases slightly. And whether it is from the comparison between different groups of collectors or from the test results of different batches, the two comparison results show the same law. Therefore, it can be shown that when the active substance content in sodium petroleum sulfonate is between 35% and 60%, the collector has the best flotation effect on fluorite mineral particles. The reason is that when the active substance content is less than 35%, the adsorption density on the fluorite surface is too low, which affects the flotation effect; when the content is higher than 60%, the content of alcohol and non-polar hydrocarbon oil that are beneficial to flotation in the components will be relatively reduced, and the alcohol and the non-polar hydrocarbon oil can enhance collector solubility and improve collector hydrophobicity.

For collector, the degree of sulfonation of the collector has a significant effect on its colloidal chemical properties, especially the dispersing ability and stabilization ability. It is the aromatic component that is sulfonated in sodium petroleum sulfonate in raw material, and the chemical composition of the aromatic hydrocarbon determines the collection performance of the aromatic hydrocarbon. The chain structure of the hydrocarbon moiety in the collector and the electron density around the ring structure determine the adsorption capacity of aromatic hydrocarbons. Therefore, it is necessary to study the effect of the composition of aromatic hydrocarbon on the collection performance of sodium petroleum sulfonate.

Experiments show that the higher the content of aromatic hydrocarbon in the raw material oil of sodium petroleum sulfonate, the higher the flotation recovery rate of fluorite, and the better the collection effect of the collector in the flotation process. But when the content of aromatic hydrocarbon is higher than 31%, the length of stable bonds adsorbed on the surface of fluorite will be shortened; When the content of benzene ring hydrocarbon is higher than 11%, the adsorption energy will decrease; when the content of naphthalene ring hydrocarbon is higher than 5.2%, the collection effect will be worse. When the molar ratio of aromatic hydrocarbon and sulfur trioxide is lower than 2.4, the degree of sulfonation of sodium petroleum sulfonate is insufficient, so that the collector forms a monolayer adsorption on the surface of fluorite, resulting in insufficient hydrophobicity. If the molar ratio is too large, for example, if it is greater than 5, the degree of sulfonation of sodium sulfonate will be too heavy, and a large amount of sodium sulfonate will form a disulfo group or even a trisulfo group. After adsorption on the surface of fluorite, the unadsorbed sulfo group has a repulsive effect, which affects the adsorption of other sodium sulfonates, and the non-polar end becomes weaker, and the hydrophobicity of the adsorbed fluorite particles is insufficient.

The components of sodium petroleum sulfonate can be classified as hydrocarbyl sulfonate (active substance), unsulfonated hydrocarbon oil, inorganic salt, n-butanol, and volatile components (moisture). The complexity of petroleum determines the structural diversity of sodium petroleum sulfonate, the non-polar group of the hydrocarbyl sulfonate in the component can be aliphatic aromatic hydrocarbon group, aromatic hydrocarbon group, alicyclic hydrocarbon group, and aliphatic hydrocarbon group, and the number of aryl groups and cycloalkyl groups in the non-polar end is different. The alkyl part of the side chain also often contains multiple branches, and the complexity of the structure is not only reflected in the hydrocarbyl sulfonate, but also in the structure of non-polar oil.

Non-polar oil is the second largest component besides hydrocarbyl sulfonate, its content and composition have a significant impact on the effect of hydrocarbyl sulfonate. Therefore, it is necessary to conduct a detailed study of the synergistic effect between non-polar oil and hydrocarbyl sulfonate. The types of hydrocarbyl sulfonate and non-polar oil, the dosing method, and the optimum molar content of hydrocarbyl sulfonates in the mixed collector have a greater impact on the synergy.

The structure of the sodium petroleum sulfonate determines its flotation performance on fluorite. In addition to affecting the association between collectors and thus affecting the solubility of the collectors, when it is adsorbed on the surface of the target mineral, it also determines its adsorption on the surface of the mineral. The aggregation state of the collector on the surface of the target mineral also affects the secondary adsorption of non-polar oil on the surface of the target mineral. From the results of the flotation test between sodium dodecyl benzene sulfonate and non-polar oil and the results of the flotation test between sodium dodecyl sulfonate and non-polar oil, no matter what kind of non-polar oil is used as auxiliary collector, the synergistic effect between sodium dodecyl benzene sulfonate and non-polar oil is obviously stronger than that of sodium dodecyl sulfonate. Structural differences have a significant effect on the synergy between hydrocarbyl sulfonate and non-polar oil, the structural difference between sodium dodecyl sulfonate and sodium dodecyl benzene sulfonate is mainly whether the non-polar end contains a benzene ring, the existence of the benzene ring makes the sodium dodecylbenzene sulfonate have a larger cross-sectional area, causing its non-polar ends to not easily gather, the existence of this phenomenon just makes the non-polar oil molecules interspersed between the non-aggregated non-polar end chains, increasing the hydrophobicity of the fluorite surface.

The effect of the structure of non-polar oil on synergy: kerosene has the best synergistic effect, followed by dodecane and monomethylnaphthalene. The structure of kerosene and dodecane is similar, the difference is that the length of the carbon chain is different, and the adsorption mode of the two on the collectors is basically the same. The reason for the strong synergistic effect of kerosene is that the carbon chain of kerosene is longer, the association ability with the non-polar hydrocarbon chain of the collector is stronger, and the longer carbon chain length can also bring better hydrophobic performance.

The dosing method is as follows: first adding sodium dodecyl benzene sulfonate and then adding emulsified kerosene, and controlling the amount of the added collector to control the ratio of the two. From the overall results, the optimal flotation effect of mixed collectors is better than that of single collectors. When the content of sodium dodecylbenzenesulfonate in the mixed collector is 77.66%, the flotation effect of the mixed collector is almost the same as that of the single collector, and even slightly higher than that of the single collector in some concentration ranges, indicating that there is a strong synergistic effect between sodium dodecyl benzene sulfonate and kerosene. When the content of sodium dodecylbenzenesulfonate in the collector is lower than 77.66%, the flotation effect of the mixed collector is weaker than that of the single collector in the whole concentration range.

Through proportional condition tests, it can be seen that the occurrence of synergy is greatly affected by the content of sodium dodecylbenzenesulfonate, and the optimum molar content is between 77.66% and 85%. The mode of action of surfactant-based collectors is that the polar end is adsorbed on the mineral surface instead of the polar end changing the hydrophobicity of the mineral surface. And non-polar oil collector does not spontaneously adsorb on the surface of polar minerals. In mixed collector, the adsorption of non-polar oil collector is preconditioned by the adsorption of surfactants on the mineral surface. The non-polar oil is adsorbed on the mineral surface through the association between hydrocarbon chains, and plays the role of changing the hydrophobicity of the mineral surface. As explained above, the occurrence of synergy is based on the pre-adsorption of sodium dodecylbenzenesulfonate as a prerequisite. Only when the sodium dodecylbenzene sulfonate adsorbed on the mineral surface reaches a certain concentration, will kerosene form co-adsorption on the mineral surface by the interaction of hydrocarbon chains, or increasing the hydrophobicity of the mineral surface by means of secondary adsorption.

Embodiment 1

A sodium petroleum sulfonate collector for fluorite flotation, comprising sodium petroleum sulfonate and non-polar oil, wherein the molar ratio of the non-polar oil to the sodium petroleum sulfonate is 3.33-5.67, the sodium petroleum sulfonate comprises raw material oil and active substance (generally hydrocarbyl sulfonate), the molecular weight of the raw material oil is 350-450, the content of the active substance is 35%-60%, the molecular weight of the sodium petroleum sulfonate is 500-750, the raw material oil comprises aromatic hydrocarbon, and the content of the aromatic hydrocarbon is between 10% and 31%, the aromatic hydrocarbon comprises benzene ring hydrocarbon and naphthalene ring hydrocarbon, the content of the benzene ring hydrocarbon is between 5% and 11%, and the content of the naphthalene ring hydrocarbon is between 5% and 5.2%, the raw material oil needs to be sulfonated by sulfur trioxide, and the molar ratio of the aromatic hydrocarbon to the sulfur trioxide in the raw material oil is between 2.4 and 5.

The sodium petroleum sulfonate is sodium alkylbenzenesulfonate, which is a sodium salt of straight-chain alkylbenzenesulfonic acid composed of 14-18 carbon atoms, and the structural formula is $CH_3(CH_2)_nSO_3Na$ (n=13-17). The preparation method of the sodium petroleum sulfonate is firstly sulfonating C14~C18 straight-chain alkanes in petroleum product to separate oil-insoluble acid residues, so as to obtain oil-soluble sulfonic acid, then neutralizing the oil-soluble sulfonic acid with sodium hydroxide to make it into crude sodium petroleum sulfonate, then, extracting the crude sodium petroleum sulfonate from neutral oil with low-carbon alcohol water, and then obtaining the refined sodium petroleum sulfonate through a series of treatments of dehydration, decolorization, deoiling, water washing, and concentration. The chemical reaction of the above process is as follows:

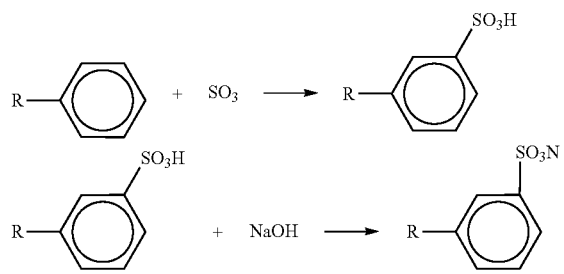

A preparation method for the sodium petroleum sulfonate collector for fluorite flotation, comprising the following steps:

S1, preparing sodium petroleum sulfonate solution by dissolving sodium petroleum sulfonate in water;

S2, putting the sodium petroleum sulfonate solution into a volumetric flask, then putting kerosene into the volumetric flask, then making up the volume and pouring it into a beaker;

S3, obtaining the sodium petroleum sulfonate collector by shaking in an ultrasonic oscillator for more than 9 minutes (to ensure adequate emulsification).

An application method of the sodium petroleum sulfonate collector for fluorite flotation, comprising the following steps:

S1, adding water to fluorite to prepare a pulp with a mass concentration of 35%, and keep the temperature at about 5° C.; wherein the calcium fluoride grade in the fluorite ore is 47.68%, and the fluorite ore is provided by a fluorite mine in Jiangxi Province, China;

S2, preparing sodium petroleum sulfonate solution by dissolving sodium petroleum sulfonate in water, then putting the sodium petroleum sulfonate solution into a volumetric flask, then putting kerosene into the volumetric flask, and then making up the volume and pouring it into a beaker, then carrying out ultrasonic emulsification to obtain the sodium petroleum sulfonate collector;

S3, adding the pulp into a flotation machine, and adjusting the pulp at 1600 r/min for 2 min; then adding sodium hydroxide to adjust the pH to 8.5; continuing to stir for 2 minutes and then adding the sodium petroleum sulfonate collector. The dosage of the sodium petroleum sulfonate collector is 1000 g/t, stirring for 3 minutes, inflating for 30 seconds, and then scraping for 5 minutes to obtain a foam product that is fluorite concentrate.

Embodiment 2

The basic content is the same as that of Embodiment 1, except that:

The content of the active substance is 53.16%, and the molecular weight of the sodium petroleum sulfonate is 563.

Embodiment 3

The basic content is the same as that of Embodiment 1, except that:

The content of the active substance is 47.82%, and the molecular weight of the sodium petroleum sulfonate is 563.

Embodiment 4

The basic content is the same as that of Embodiment 1, except that:

The content of the active substance is 61.56%, the molecular weight of the sodium petroleum sulfonate is 563, and the molar ratio of the aromatic hydrocarbon to sulfur trioxide is 2.66.

Embodiment 5

The basic content is the same as that of Embodiment 1, except that:

The content of the active substance is 48.42%, the molecular weight of the sodium petroleum sulfonate is 606, and the molar ratio of the aromatic hydrocarbon to sulfur trioxide is 2.66.

Embodiment 6

The basic content is the same as that of Embodiment 1, except that:

The molecular weight of the raw material oil is 448, the content of the active substance is 45.44%, and the content of the aromatic hydrocarbon is 30.81%.

Embodiment 7

The basic content is the same as that of Embodiment 1, except that:

The content of the active substance is 61.56%, the content of the aromatic hydrocarbon is 30.81%, the content of the naphthalene cyclic hydrocarbon is 5.6%, and the molar ratio of the aromatic hydrocarbon to sulfur trioxide is 2.8.

Embodiment 8

The basic content is the same as that of Embodiment 1, except that:

The molecular weight of the raw material oil is 415, the content of the active substance is 42.04%, the molecular weight of the sodium petroleum sulfonate is 621, and the content of the aromatic hydrocarbon is 30.81%.

Embodiment 9

The basic content is the same as that of Embodiment 1, except that:

The molecular weight of the raw material oil is 415, the content of the active substance is 44.26%, the molecular weight of the sodium petroleum sulfonate is 621, and the content of the aromatic hydrocarbon is 30.81%.

Embodiment 10

The basic content is the same as that of Embodiment 1, except that:

The molecular weight of the raw material oil is 415, the content of the active substance is 42.13%, the molecular weight of the sodium petroleum sulfonate is 621, and the content of the aromatic hydrocarbon is 30.81%.

According to the methods in the above Embodiments 1 to 10, the flotation test results are shown in Table 1 below.

TABLE 1

Flotation results for different embodiments of flotation methods

| Embodiments | Concentrate grade/% | Recovery rate/% |
|---|---|---|
| Embodiment 1 | 98.11 | 95.22 |
| Embodiment 2 | 98.32 | 96.62 |
| Embodiment 3 | 99.05 | 97.38 |
| Embodiment 4 | 98.85 | 96.43 |
| Embodiment 5 | 98.77 | 97.11 |
| Embodiment 6 | 98.98 | 97.56 |
| Embodiment 7 | 98.59 | 95.29 |
| Embodiment 8 | 98.53 | 96.53 |
| Embodiment 9 | 98.84 | 97.08 |
| Embodiment 10 | 98.67 | 95.83 |

By comparing Embodiments 1 to 10, it can be found that within the range of parameters proposed in this design, sodium petroleum sulfonate has a very good flotation recovery effect on fluorite in a low temperature environment. At 5° C., the grade of fluorite concentrate is over 98%, and the recovery rate is over 95%. Therefore, the technical solution proposed by this disclosure has a good effect on fluorite flotation at low temperature.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sodium petroleum sulfonate collector for fluorite flotation, comprising: sodium petroleum sulfonate and non-polar oil, wherein the molar ratio of the non-polar oil to the sodium petroleum sulfonate is 3.33-5.67, the sodium petroleum sulfonate comprises raw material oil and active substance, the molecular weight of the raw material oil is 350-450, the content of the active substance is 35%- 60%, the molecular weight of the sodium petroleum sulfonate is greater than 500 and smaller than 750, the raw material oil comprises aromatic hydrocarbon, and the content of the aromatic hydrocarbon is between 10% and 31%, the aromatic hydrocarbon comprises benzene ring hydrocarbon and naphthalene ring hydrocarbon, the content of the benzene ring hydrocarbon is between 5% and 11%, and the content of the naphthalene ring hydrocarbon is between 5% and 5.2%, the sodium petroleum sulfonate comprises active substance derived from a reaction of the raw material oil with sulfur trioxide at a molar ratio of aromatic hydrogen to sulfur trioxide between 2.4 and 5, which produces 35 to 60% yield of the active substance comprising the sulfonated petroleum sulfonate, wherein the sodium petroleum sulfonate is sodium alkylbenzenesulfonate, which is a sodium salt of straight-chain alkylbenzenesulfonic acid, the straight-chain alkyl composed of 14-18 carbon atoms with structural formula $CH_3(CH_2)_nSO_3Na$ (n=13-17), and wherein the non-polar oil is kerosene.

2. A method of performing fluorite flotation, the method comprising the following steps: S1, adding water to fluorite to prepare a pulp and keeping the temperature of the pulp constant; S2, adding the pulp into a flotation machine and stirring the pulp, then adding sodium hydroxide to adjust the pH value of the pulp, then adding the sodium petroleum sulfonate collector of claim 1, then stirring, aerating, and then scraping foam to get a foam product comprising fluorite concentrate.

* * * * *